(No Model.) 4 Sheets—Sheet 3.
W. ROBINSON.
MECHANICAL MOVEMENT.
No. 592,124. Patented Oct. 19, 1897.
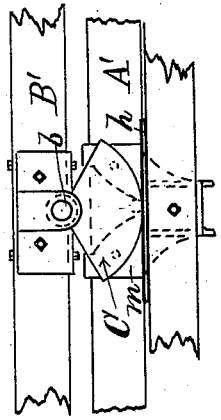
Fig. 4.
Fig. 5.
Fig. 6.
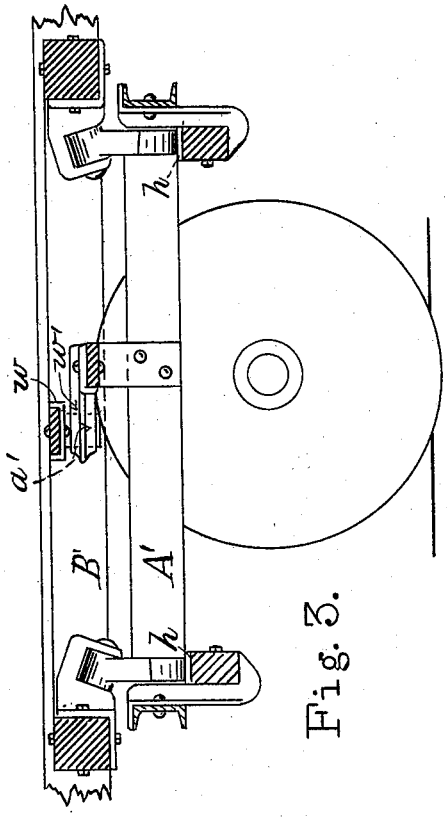
Fig. 3.
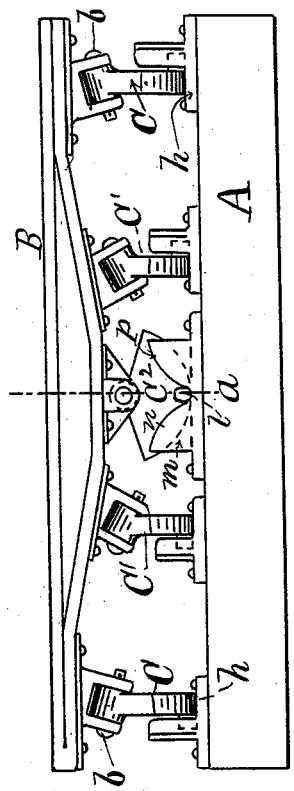
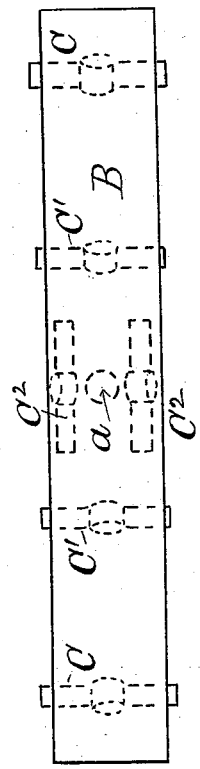
WITNESSES:
Jas. W. Ripley.
Chauncey B. Allen
INVENTOR:
Wm. Robinson.

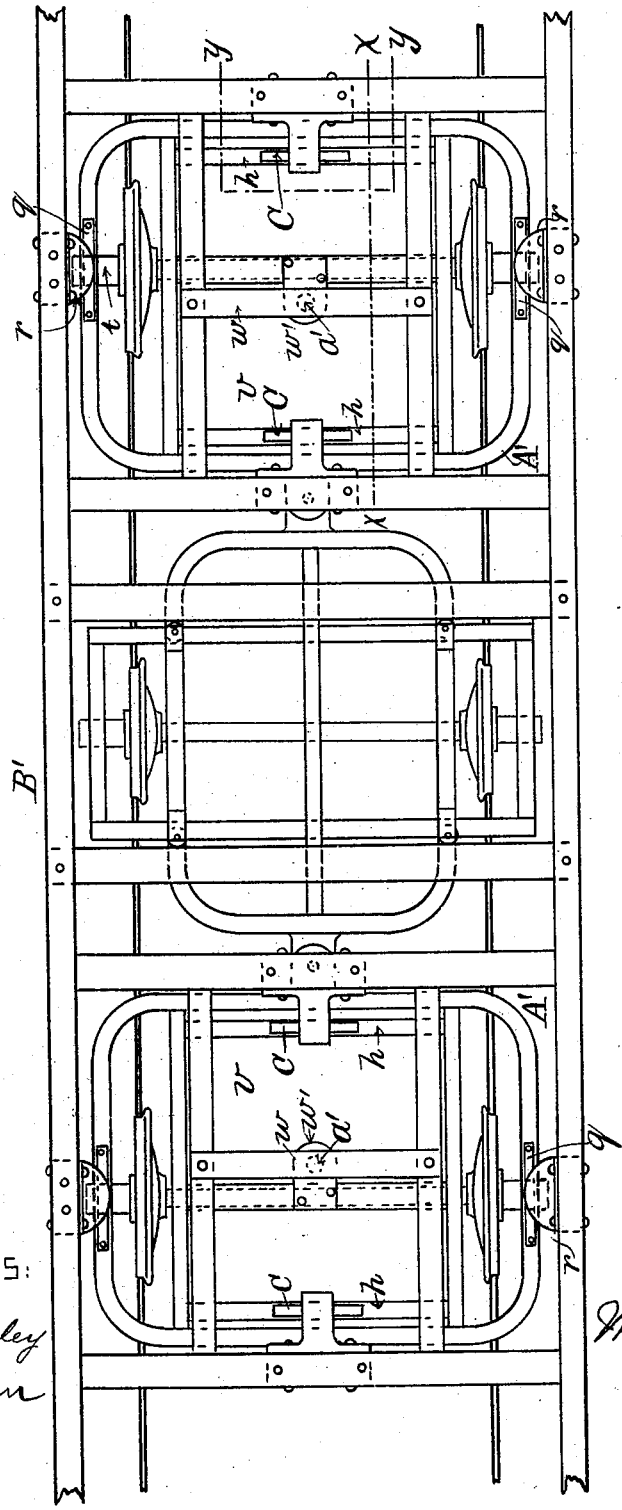

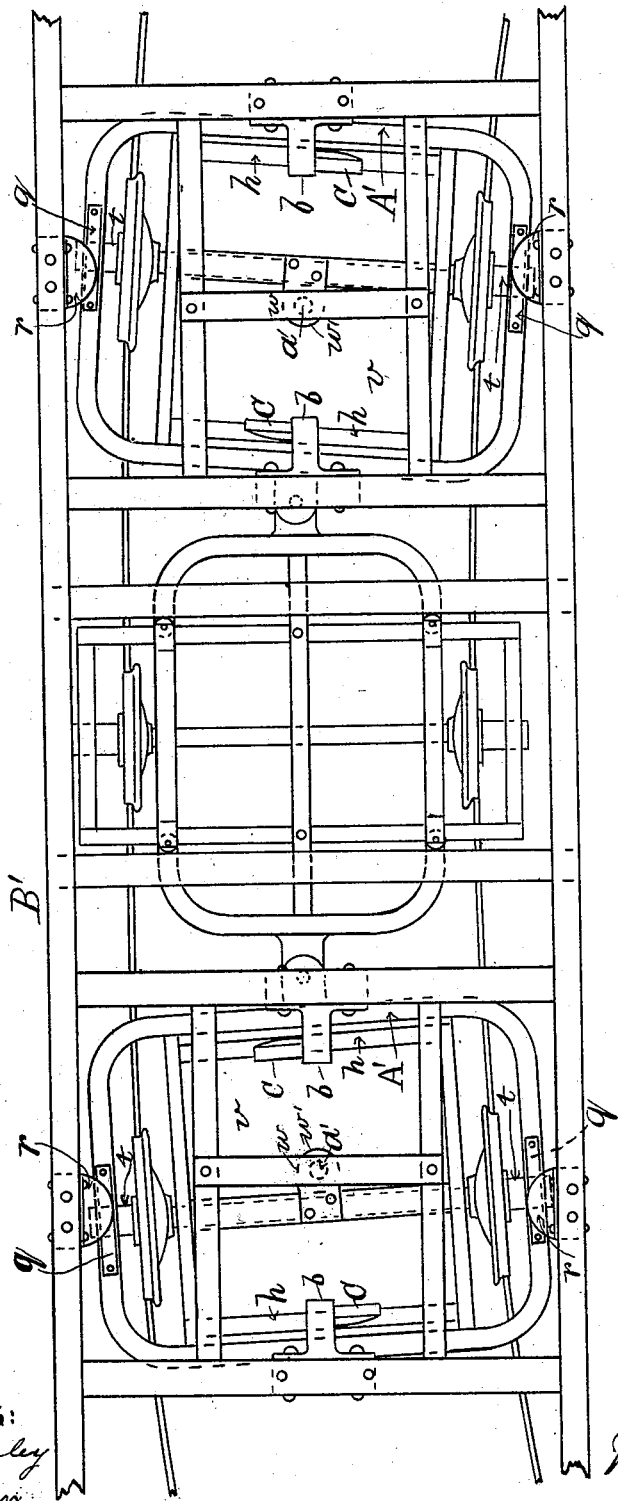

(No Model.) 4 Sheets—Sheet 4.
W. ROBINSON.
MECHANICAL MOVEMENT.
No. 592,124. Patented Oct. 19, 1897.
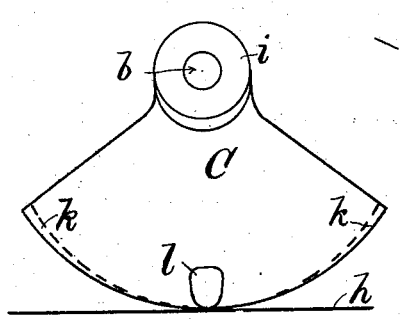
Fig. 7.
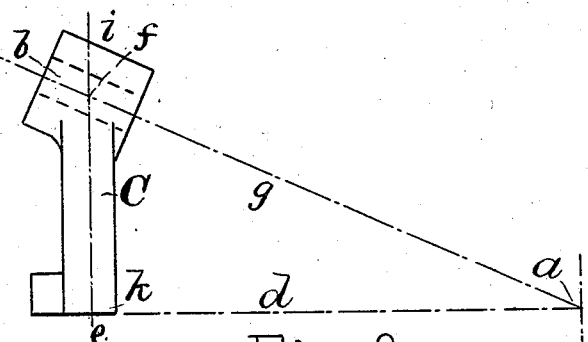
Fig. 8.
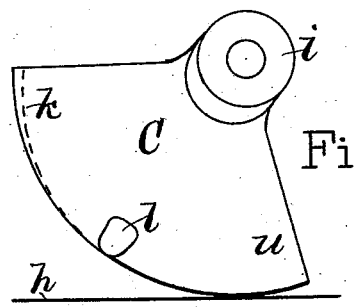
Fig. 9.
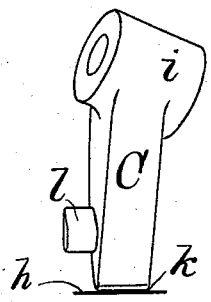
Fig. 10.
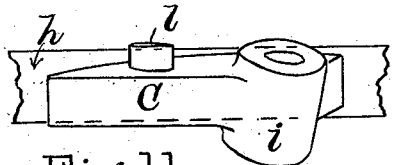
Fig. 11.
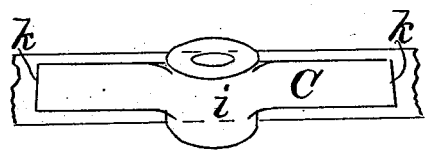
Fig. 12.
Fig. 13. Fig. 14. Fig. 15.
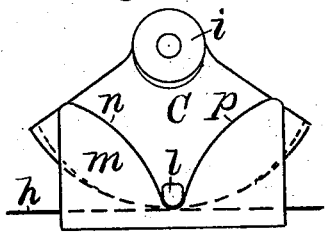
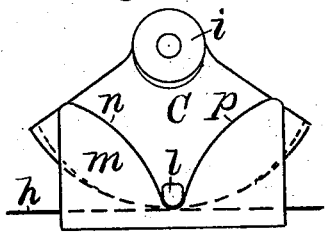
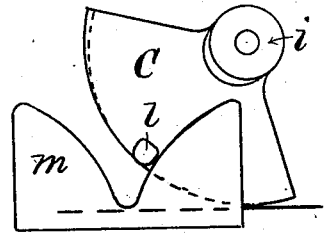
WITNESSES:
Jas. W. Ripley.
Chauncey B. Allen
INVENTOR:
Wm. Robinson.

UNITED STATES PATENT OFFICE.

WILLIAM ROBINSON, OF BOSTON, MASSACHUSETTS.

MECHANICAL MOVEMENT.

SPECIFICATION forming part of Letters Patent No. 592,124, dated October 19, 1897.

Application filed August 13, 1895. Serial No. 559,177. (No model.)

*To all whom it may concern:*

Be it known that I, WILLIAM ROBINSON, a citizen of the United States, residing at Boston, in the county of Suffolk and State of Massachusetts, have invented a new and Improved Mechanical Movement, of which the following is a specification.

My invention has reference to antifriction devices located between two bodies, one swiveling upon the other, and the construction, arrangement, and operation of said elements with reference to each other.

The nature of my invention will be clearly understood from the description which follows, reference being had to the accompanying drawings, which form a part of this specification, in which—

Figure 1 is a plan view of a radial car on a straight track, and Fig. 2 a similar view of the same on a curved track, each illustrating, in a general way, one application of my invention. Fig. 3 is a section through the line $x\ x$, Fig. 1; and Fig. 4, a section through the line $y\ y$, Fig. 1. Fig. 5 shows the application of my invention between the body-bolster and the truck-bolster of an ordinary railroad car or coach; and Fig. 6 is a top view of the same, showing the antifriction devices in dotted outline. Fig. 7 is a face view of the antifriction-segment in its normal position. Fig. 8 is an edge view of the same, showing diagrammatically the method of determining the correct inclination of the axis of said segment. Fig. 9 is a face view of the segment in the position which it assumes when rolled over by the swiveling upon each other of the bodies between which it is placed. Fig. 10 is an edge view of the same. Fig. 11 is a top view of Fig. 9, and Fig. 12 is a top view of Fig. 7. Fig. 13 is a side view of a guide to insure the correct position of the segment. Fig. 14 shows the combination of the segment in its normal position with said guide; and Fig. 15 shows the segment, approximately in the position illustrated in Fig. 9, in connection with its guide.

A is the bolster of a car-truck, and B the bolster of the car-body, swiveling centrally thereon at $a$, in the usual manner. Between these bolsters are placed antifriction segmental bearings C, which are pivotally connected to the body-bolster B by diagonal pivots or bearings $b$, as clearly shown in Fig. 5.

The contruction of the segment C is fully illustrated in the detail drawings.

Fig. 8 shows how to obtain the correct inclination of the angle of the pivotal bearing $b$. In this figure $a$ indicates the swiveling center of the two bodies A and B, for instance, upon each other. $d$ is the base of the triangle, representing the distance from the swiveling center $a$ to the center $e$ of the base of the segment C. $e\ f$ represent the height of the segment from its base to the center $f$ of the diagonal bearing $b$. The diagonal bearing $b$, when laid out mathematically, coincides with the hypotenuse $g$, joining the points $a$ and $f$. When constructed in this way and mounted as shown, the periphery of the segment C travels on its track $h$ in a substantially straight line. It will be observed, however, that when the bolster B swivels on the bolster A, since the periphery of the segment C travels in a straight line, the outer end $u$ of said periphery moves farther away from the swiveling center $a$, while the hub $i$ of said segment remains a constant distance from said swiveling center. The upper part of said segment therefore leans inwardly from the perpendicular, as clearly shown in Fig. 10. I therefore gradually bevel off or cone the surface of the periphery of said segment from its center in both directions to its outer ends, as shown at $k$, in order that the periphery of said segment shall always present a contact-surface across its whole width to the horizontal surface of the track on which it rolls.

In order that the segment C may be sure to seek its proper position and retain it when the bodies A and B are brought together, I provide the segment C with a projection $l$ and the body A with a guide $m$, having flanges flaring out at each side from its center, as shown at $n\ p$, and the lug or projection $l$ projects into said guide between said flanges $n\ p$, as a consequence of which the segment C always has a fixed relation to the guide $m$—that is, to the body A—as illustrated more particularly in Figs. 4, 5, 13, 14, and 15.

Figs. 5 and 6 illustrate the application of my invention to both the center and side bearings of an ordinary car-truck A and the bolster B of the car-body resting thereon. In this case the segments C are the side bearings and the segments C' and C² the center bearings. It is desirable to bring the bearings C' and C² as near to the swiveling center $a$ as practicable.

It will be noted that the segments C² travel longitudinally on the bolster A, while the segments C' travel across said bolster and at right angles to said segments C². Thus the bolsters or similar bodies A B may be provided with any desired number of antifriction-segment bearings, as described, limited only by the space between said bodies A B.

In Figs. 1, 2, and 3 A' is the swiveling-truck, swiveling at $a'$ on the car-body or main truck-frame B'. In this case the antifriction-segments C are arranged along the longitudinal center line of the main frame B', and the peripheries of said segments travel across said center line, keeping a position, however, substantially parallel to the track $h$ on the swiveling truck-frame A'.

In Figs. 1 and 2 friction-plates $q$ are shown secured to the sides of the swiveling-frame A', and above these friction-plates $r$ are secured to the main frame B'. These friction-plates are intended more particularly to steady the position of the main frame B' on the frames A', and not to carry any material portion of the weight, the main portion of the weight being carried on the antifriction-segments described. Friction-plates are shown, in this case simply for lack of room, over the axle-boxes $t$ to put in the segmental antifriction-bearings described. It is intended, however, when conditions permit, to have all the load-supporting bearings between the frames A' and B' of the segmental antifriction type described.

It will be seen that between two bodies, one swiveling on the other, an indefinite number of the antifriction-bearings described may be arranged around the swiveling center of said bodies, each segment, when in its normal position, crossing at right angles the radial line passing through said swiveling center and the center of said segment.

When the truck shown in Figs. 1, 2, and 3 is used as a motor-truck, the application of my invention, as described, to this form of truck enables me to leave a clear open space $v$ directly above the motor, since the swiveling-plates $w$ $w'$ carry no weight, and are therefore of the simplest construction and take up but a minimum of space.

It is evident that, among other advantages, my invention has a decided advantage over any other antifriction-bearing where space is limited. The periphery of the segment C, traveling on a straight track, occupies only the space required by said straight track, whereas the conical roller, for instance, requires a curving track, which occupies much more space. This economy of space is, in some situations, an important consideration—for instance, in a motor-truck, where the space is always too limited.

I do not limit the application of my invention to car-trucks. It may be used in any situation where found advantageous and still be in conformity with the spirit of my invention.

Having thus described my invention, what I claim as new, and desire to secure by Letters Patent, is—

1. A mechanical movement consisting, essentially, of two bodies arranged to swivel one upon the other and a segmental bearing between them, said segmental bearing having a hub provided with a diagonal axis pivoted to one of said bodies and its peripheral surface beveled in either direction from its center on a gradually-changing curve, said peripheral surface traveling on a flat or horizontal surface on the other body.

2. A mechanical movement consisting, essentially, of a plurality of segmental bearings located between two bodies arranged to swivel one upon the other, each of said segmental bearings having a hub provided with a diagonal axis pivotally connected to one of said bodies and its periphery having its face beveled off gradually on a changing curve from its center toward either end, said peripheral surface traveling or rolling on a flat or horizontal surface on the other body.

3. A mechanical movement consisting, essentially, of segmental bearings located between two bodies arranged to swivel one upon the other, the hub of each of said segmental bearings swiveling on one of said bodies on an axis forming an acute angle to the inner plane face of said segment, the peripheral surfaces of said segments being beveled off on a gradually-changing curve from their centers toward either end, said peripheral surfaces rolling on the other body in an approximately straight line.

4. In a mechanical movement, a segmental bearing formed with a hub having an axis forming an acute angle with the inner flat or plane face of said segmental bearing, substantially as described.

5. A mechanical movement consisting, essentially, of a plurality of segmental bearings located between two bodies arranged to swivel one upon the other, each of said segmental bearings having a hub provided with a diagonal axis pivotally connected to one of said bodies and its periphery having its surface beveled off gradually on a changing curve from its center toward either end, some of said segmental bearings being arranged in an angular position relatively to some of the other similar bearings, substantially as described.

6. In a mechanical movement, a segmental bearing formed with a hub having an axis coinciding, substantially, with the hypotenuse of a triangle formed, when said segmental bearing is in its normal position, by a horizontal line passing through the center of the base of said segment, a vertical line rising from the center of said base to the center of said axis and a hypotenuse joining the center of said axis and said base-line at the swiveling center of two bodies between which said segment forms a bearing, substantially as described.

7. In a mechanical movement, a segmental bearing formed with a hub having an axis diagonal to its inner flat or plane surface, said axis pointing to the swiveling center of two bodies between which said bearing is located, the line of said axis, extended, intersecting said swiveling center on a horizontal plane passing through the peripheral contact-point of said segmental bearing with the body on which said periphery travels, substantially as described.

8. In a mechanical movement, a segmental bearing formed with a hub having a diagonal axis and a periphery having its face beveled off gradually or coned on a changing curve from the center toward either end of said periphery, as and for the purpose described.

9. The swiveling sector C having one side provided with the lug or projection $l$ located between the axis and periphery of said sector, in combination with the guide $m$, said guide being arranged to govern and limit the position of said sector by engaging said lug or projection $l$, substantially as described.

10. The guide $m$ having a narrow opening at the bottom with sides gradually widening out toward the top, in combination with a sector movable on its axis, said sector being provided on one side with a projection or lug located between the axis and periphery of said sector, said guide $m$ engaging said lug and thereby controlling the position and movement of said sector, substantially as described.

WILLIAM ROBINSON.

Witnesses:
CHAS. H. BURRAGE,
CHAUNCEY B. ALLEN.